United States Patent [19]

Ginsberg

[11] 4,084,971
[45] Apr. 18, 1978

[54] PROTECTIVE COATINGS FOR FERROUS METALS

[75] Inventor: Thomas Ginsberg, Piscataway, N.J.

[73] Assignee: Union Carbide Corporation, New York, N.Y.

[21] Appl. No.: 710,737

[22] Filed: Aug. 2, 1976

[51] Int. Cl.² ............................................. C09D 5/10
[52] U.S. Cl. ............................... 106/1.17; 106/14.44; 106/287.17; 252/390
[58] Field of Search ..................... 106/1, 14, 287 SE; 252/390, 387, 394

[56] References Cited

U.S. PATENT DOCUMENTS

| 2,771,417 | 11/1956 | Ryznar et al. | 252/390 |
| 3,884,705 | 5/1975 | Blair | 106/14 |

*Primary Examiner*—Lorenzo B. Hayes
*Attorney, Agent, or Firm*—Bernard Francis Crowe

[57] ABSTRACT

A metal protecting composition is obtained by blending zinc a partially-hydrolyzed organic silicate and a fatty acid amidoamine.

8 Claims, No Drawings

PROTECTIVE COATINGS FOR FERROUS METALS

BACKGROUND OF THE INVENTION

This invention pertains to ferrous metal protecting compositions, and more particularly to single-package systems having long shelf lives.

Zinc-rich ferrous metal protecting coatings have been available for some time but in general they require two or three separate packages of the requisite ingredients since gelling, settling or other undesirable phenomena take place if a single package is used. Attempts to prepare a single package zinc-rich silicate coating are well known to those skilled in the art. The desirability for a single package zinc-rich silicate coating has been recognized for some years and recently a few have become available commercially. For example U.S. Pat. No. 3,653,930 discloses a single package zinc-rich coating based on the addition of low molecular weight amines to hydrolyzed ethyl silicate in conjunction with nitro compounds to prevent gassing. U.S. Pat. No. 3,660,119 exposes some of the problems inherent in amine-containing alkyl silicate zinc-rich coatings including loss of effectiveness with time on standing. This disclosure claims the use of strong bases, such as, sodium or potassium methoxide or ethoxide to impart stability to these compositions. U.S. Pat. No. 3,859,101 also uses low-molecular weight amines in a single package alkyl silicate zinc-rich coating and precludes gassing in the container by the addition of zinc chromate. However the use of low-molecular weight amines is undesirable because their volatility results in loss of effectiveness with time, and is a potential health hazard.

SUMMARY OF THE INVENTION

A composition for protecting ferrous metals from corrosion which is stable as a one-package system has been developed which comprises particulate zinc, a partially-hydrolyzed organic silicate having the formula:

$$Si{+}(OR)_4$$

wherein R is a monovalent radical selected from the group consisting of alkyl or alkoxy alkyl, said alkyl and alkoxy groups having two to four carbon atoms and a curing amount of a fatty acid amidoamine formed by the interaction of about one mole of at least one olefinically unsaturated fatty acid having 10 to about 24 carbon atoms and about one mole of an alkylene polyamine containing two primary amine groups and at least one secondary amine group wherein the alkylene groups contain about 2 to about 5 carbon atoms.

The hydrolyzed organic silicates of this invention include alkyl polysilicates such as that available from Union Carbide Corporation under the trade name "Ethyl Silicate 40" which is composed of mixed ethyl polysilicates with an average of five silicon atoms per molecule having an available $SiO_2$ content of about 40 percent. Other partially-hydrolyzed alkyl silicates include: Cellusolve Silicate X-4019 (40% hydrolyzed-containing 19% $SiO_2$) Cellosolve Silicate X-8018 (80% hydrolyzed-containing 18% $SiO_2$), Ethyl Silicate P-18 (80% hydrolyzed-containing 18% $SiO_2$) and Ethyl Silicate P-20 (18% hydrolyzed-containing 20% $SiO_2$). Cellosolve is a trademark of Union Carbide Corporation for monoethyl ether of diethylene glycol.

The preferred partially-hydrolyzed organic silicates are alkoxyethylpolysilicates having the structure:

$$(R'OCH_2CH_2)_x(SiO_2)_yH_z$$

wherein R' is methyl, ethyl, n-propyl, isopropyl, isobutyl, sec-butyl or n-butyl, the ratio of x to y is about 0.15 to about 3; y is at least 4; each $ROCH_2CH_2-$ is bonded to Si through oxygen; and z is 0 or a positive number which constitutes the number of residual ≡ SiOH groups in the polymer.

These alkoxyethylpolysilicates can be prepared by the interaction of an alkoxyalkanol with silicon tetrachloride. Illustrative alkoxyalkanols include methoxyethanol ($CH_3OCH_2CH_2OH$), ethoxyethanol ($CH_3CH_2OCH_2CH_2OH$), n-propoxyethanol ($CH_3CH_2CH_2OCH_2CH_2OH$) and n-butoxyethanol ($CH_3CH_2CH_2CH_2OCH_2CH_2OH$).

The general method of preparation for ethoxyethylpolysilicate involves first reacting 279 parts by weight of ethoxyethanol with 170 parts by weight of silicon tetrachloride ($SiCl_4$), then adding 10.8 parts by weight of water and heating the mixture to reflux at atmospheric or reduced pressure to complete the removal of the by-product, HCl. The solution is then neutralized with magnesium silicate and filtered.

More specifically, the $SiCl_4$ is fed to the ethoxyethanol in a stirred reactor equipped with a condenser and vent scrubber. Heat is evolved in the early stages of addition and the system becomes endothermic in the latter stages. Then the water is added causing a mild exothermic reaction. The byproduct HCl is removed during reflux at atmospheric pressure and 200° C, or under a vacuum of 355 mm. Hg at 160° C.

The ethoxyethylpolysilicate produced by the above described procedure has the following properties:

| | |
|---|---|
| $SiO_2$ content, % by weight | 19.0–19.5 |
| specific gravity, 20/20° C. | 1.048–1.054 |
| non-volatiles, % by weight | 90–95 (rotary evaporator to 110° C. at 5 mm. Hg) |
| acidity, in parts per million of HCl | <20 |
| color | <4 Gardner |

Another ethoxyethylpolysilicate can be produced by mixing 5.9 parts by weight of a 0.5 weight percent aqueous hydrochloric acid solution for a few minutes in 100 parts by weight of ethoxyethylpolysilicate described above. Its properties are as follows:

| | |
|---|---|
| specific gravity 20/20° C. | 1.052–1.058 |
| $SiO_2$, % by weight | 17.9–18.4 |
| acidity, parts per million HCl | 200–400 |

By varying the degree of hydrolysis by altering the amount of water employed, an ethoxyethylpolysilicate can be obtained having the following properties:

| | |
|---|---|
| specific gravity at 20/20° C. | 1.05 |
| available silica as $SiO_2$ | 19% by weight |
| free 2-ethoxyethanol | 20% by weight |
| acidity as HCl | 50 ppm |
| color, Gardner | 1 (pale yellow) |
| flashpoint, tag closed cup (ASTM D56) | 131° F. |

| | |
|---|---|
| tag open cup (ASTM D-1310) | 144° F. |

The zinc particles employed in the composition of this invention have an average particle size ranging from about 3 to about 9 microns. The amount by weight of zinc used is preferably from 2 to about 10 times the amount by weight of the organic polysilicate employed in this composition.

The fatty acid amidoamines used in this invention are commercially available products synthesized by the reaction of ethylenically unsaturated fatty acids including: $\Delta^9$-decylenic, stillingic, $\Delta^9$-dodecylenic, palmitoleic, oleic, ricinoleic, pretroselinic, vaccenic, linoleic, linolenic, eleostearic, punicic, licanic, parinaric, gadolein, arachidonic, 5-eicosenic, cetoleic, erucic, 5,13-docosadienic, nervonic acids and the like with an amine. Such fatty acids are reacted in approximately equimolar amounts with a chosen alkenyl polyamine containing two primary amine groups and at least one secondary amine group whereby acid amines are obtained. Exact stoichiometric amounts of these reactants are not necessary.

A preferred fatty acid amidoamine is prepared by the interaction of linoleic or eleostearic acid with an alkylene polyamine such as diethylenetriamine, triethylenetetramine, dimethylaminopropylene, diethylaminopropylene, tetraethylenepentamine, and the like. These alkenyl polyamines have the formula:

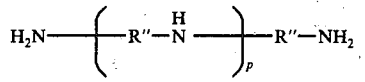

wherein R'' is an alkylene group having 2 to about 5 carbon atoms inclusive and p is an integer having values of 1 to about 5 inclusive.

The fatty acid amidoamines described above are available commercially as Genamid 2000, 250, and 788 from General Mills Chemicals Inc. and Araldite 955 supplied by Ciba Company.

Modified fatty acid amidoamines can also be used such as polyamide adducts disclosed in U.S. Pat. No. 3,900,437 which is incorporated herein by reference. These are obtained by the interaction of: (a) an amine component having the formula:

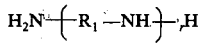

wherein $R_1$ is an aromatic group containing 6 to 10 carbon atoms or an alkylene group containing 2 to 4 carbon atoms and r is an integer having values from 1 to 5.

(b) a monoepoxide component selected from monoepoxide having the formula:

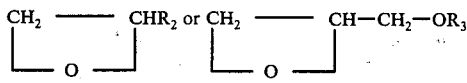

wherein $R_2$ is hydrogen, phenyl or alkyl having 1 to 10 carbons and $R_3$ is phenyl or alkyl having 1 to 10 carbon atoms; and (c) an acid component selected from monomeric, aliphatic, unsaturated monocarboxylic fatty acids containing 16 to 22 carbon atoms or polymeric fatty acids containing 32 to 44 carbon atoms. Products of this type are commercially available under the tradename Genamid 788 from General Mills Chemicals, Inc.

The partially-hydrolyzed alkyl organic silicates of this invention are not capable of forming dry protective films on metal substrates by themselves but remain indefinitely wet as with oily films. The fatty acid amidoamines also are not capable of forming dry films by themselves remaining as liquid films indefinitely. When the hydrolyzed alkyl organic silicates and fatty acid amidoamines are mixed together in conjunction with particulate zinc, smooth, free-flowing compositions are obtained which have excellent package stability lasting for months without prematurely curing. When films of these mixtures are coated on a ferrous substrate, dry films are obtained in a matter of minutes. The fast curing which takes place is quite unexpected; no theoretical explanation is available at the present time to explain this unusual result.

The amount of fatty acid amidoamine required in these zinc-rich primary compositions is not narrowly critical but it is preferred to use from about 5% to about 50% parts by weight based on the weight of partially-hydrolyzed organic silicate.

The invention is further described in the examples which follow. All parts and percentages are by weight unless otherwise specific.

EXAMPLE 1

A ferrous metal coating vehicle was prepared by mixing 60 grams of hydrolyzed ethoxyethylpolysilicate containing 40 weight percent of $SiO_2$ (available from Union Carbide Corporation as Cellosolve Silicate X-4019) with 30 grams of Genamid 2000 (an amidoamine prepared by the interaction of unsaturated fatty acids with an equimolar amount of polyalkylene amine having a viscosity of 10-25 poise and an amine value of about 560 mg. of KOH per gram of amine). A clear, slightly amber-colored solution was obtained. To this was added 600 grams of Asarco L-15 (zinc dust provided by American Smelting & Refining Company having a particulate size of 2 to 15 microns). The mixture had a consistency of a heavy paste which was converted to a fluid, sprayable paint by mixing in 110 grams of toluene. The resultant composition when applied to sandblasted, cold-rolled steel panels measuring approximately 4 inches × 8 inches × ⅛ inch provided a smooth dry film in about 20 minutes when exposed to the ambient air. When the steel panel so coated was subjected for 500 hours in salt spray according to ASTM B-117 and 500 hours in fresh water immersion tests (ASTM D-870) there was no evidence of corrosion or other signs of failure such as mud cracking, peeling, pitting or the like. The liquid protective coating had a stability storage of over three months.

EXAMPLE 2

A protective composition was prepared by mixing 120 grams of ethoxyethylpolysilicate (Cellosolve Silicate X-4019) with 12 grams of Genamid 2000. A clear slightly yellow solution resulted. This solution was thinned using a ratio of 66 grams of the solution described above to 30 grams of toluene. To the resultant mixture was added 600 grams of Asarco L-15 zinc dust. The paint which was thus formulated when applied to the sand blasted steel panels used in Example 1 formed a dry film in about 20 minutes at ambient conditions. The coated steel panels were subjected to 500 hours in fresh water immersion. The panels showed no signs of corrosion or other failure under either conditions of exposure. The liquid paint which was formulated in this example was stable for over two months in storage.

EXAMPLE 3

A ferrous metal protective composition was prepared by mixing 120 grams of ethoxyethylpolysilicate (Cellosolve Silicate X-4019) with 3 grams of Genamid 2000. A clear slightly yellow solution was obtained. This solution was thinned by using a ratio of 61.5 grams of the solution to 30 grams of toluene. To the resultant mixture was added 600 grams of Asarco L-15 zinc dust. The paint provided when applied to sand blasted steel panels described in Example 1 formed a dry film in about 30 minutes under ambient conditions. The coated steel panels when subjected to 500 hours in salt spray and 500 hours in fresh water immersion showed no corrosion or other failure. The liquid paint provided in this example was stable in storage for more than two months.

EXAMPLE 4

A ferrous metal protective vehicle was prepared by mixing 60 grams of ethoxyethylpolysilicate (Cellosolve Silicate X-4019) with 18 grams of Genamid 250, an amidoamine obtained by heating an equimolar mixture of a mixture of C-18 unsaturated fatty acids with an alkylene polyamine. [An equivalent amidoamine can be prepared by heating 285 grams of Aconew 500 (distilled tall oil fatty acids made by Tenneco Newport Co. containing about 0.9% rosin acids and a 98.1% mixture of unsaturated fatty acids uncluding oleic, linoleic and linolenic acids) with 189.5 grams of tetraethylenepentamine at about 335° F. (168° C.) for one hour or until an acid value below 9 mg. of KOH per gram of product is obtained]. A clear slightly yellow solution was obtained which was thinned with 30 grams of mineral spirits AMSCO 66/3. To this solution was added 700 grams of Asarco L-15 zinc dust. The resultant paint when applied to the sand blasted steel panels described in Example 1, dried under ambient conditions in about 20 minutes. The steel panels so coated showed no signs of corrosion or failure after 360 hours in salt spray and in fresh water immersion tests. The liquid paint had a stability on storage of over 1 month.

EXAMPLE 5

A ferrous metal protective vehicle was prepared by mixing 60 grams of ethoxyethylpolysilicate (Cellosolve Silicate X-4019) with 6 grams of Genamid 250. A clear slightly yellow solution was obtained which was thinned with 30 grams of mineral spirits. To this solution was added 700 grams of Asarco L-15 zinc dust. The resultant paint formed the film that dried in about 20 minutes when applied to the sand blasted steel panels described in Example 1. The steel panel so coated showed no corrosion or other failure after 360 hours in the salt spray and fresh water immersion. The liquid paint had a stability in storage of over one month.

EXAMPLE 6

When Example 1 is repeated with the exception that methoxyethylpolysilicate is substituted for the ethoxyethylpolysilicate, a stable protective coating vehicle is obtained which affords similar results when applied to sand blasted steel panels and tested in the salt water and fresh water immersion tests.

EXAMPLE 7

When Example 1 is repeated with the exception that Ethyl Silicate 40 (a light-colored liquid composed of mixed ethyl polysilicates with an average of 5 silicon atoms per molecular and an available $SiO_2$ content of about 40% by weight sold by Union Carbide Corporation) is substituted for the ethoxyethylpolysilicate, comparable results are obtained when the resultant stable paint is used to coat sand blasted steel panels which are then tested in the salt spray and fresh water immersion tests.

EXAMPLE 8

When Example 1 is repeated with the exception that the Genamid 2000 is replaced by Genamid 788 comparable results are obtained.

Although the invention has been described in its preferred forms with a certain degree of particularity, it is understood that the present disclosure of the preferred form has been made only by way of example and that numerous changes may be resorted to without departing from the spirit and scope of the invention.

What is claimed is:

1. In a composition for protecting ferrous metals from corrosion comprising a partially hydrolyzed organic silicate and particulate zinc, the improvement which comprises adding a curing amount of a fatty acid amidoamine formed by the interaction of about one mole of at least one ethylenically unsaturated fatty acid having 10 to about 24 carbon atoms and about one mole of an alkylene polyamine containing two primary amine groups and at least one secondary amine group wherein the alkylene group contains about 2 to about 5 carbon atoms.

2. Composition claimed in claim 1 wherein the hydrolyzed organic silicate is an alkoxyalkylpolysilicate.

3. Composition claimed in claim 2 wherein the alkoxyalkylpolysilicate is ethoxyethylpolysilicate.

4. Composition claimed in claim 1 wherein the hydrolyzed organic silicate is a hydrolyzed tetraalkyl orthosilicate.

5. Composition claimed in claim 4 wherein the tetraalkyl orthosilicate is tetraethyl orthosilicate.

6. Composition claimed in claim 1 wherein fatty acid amidoamine is derived from a mixture of oleic, linoleic and linoleic acids.

7. Composition claimed in claim 1 wherein the alkylene polyamine is pentaethylene tetramine.

8. Composition claimed in claim 1 wherein the fatty acid amidoamine is modified by interacting the fatty acid and polyamine with a monoepoxide selected from monoepoxides having the formula:

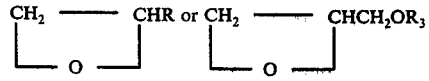

wherein $R_2$ is hydrogen, phenyl, or alkyl having 1 to 10 carbons and $R_3$ is phenyl or alkyl having 1 to 10 carbon atoms.

* * * * *

UNITED STATES PATENT OFFICE
CERTIFICATE OF CORRECTION

Patent No. 4,084,971         Dated  April 18, 1978

Inventor(s)  T. Ginsberg

It is certified that error appears in the above-identified patent and that said Letters Patent are hereby corrected as shown below:

At Column 4, line 27 "specific" should read -- specified --.

At Column 6, line 50 "and linoleic acids" should read -- and linolenic acids --.

At Column 6, lines 58-60, the first formula should appear as:

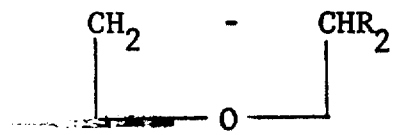

Signed and Sealed this

Thirteenth Day of February 1979

[SEAL]

Attest:

RUTH C. MASON
Attesting Officer

DONALD W. BANNER
Commissioner of Patents and Trademarks